Dec. 9, 1952 J. W. OVERBEKE 2,620,733
HYDRAULIC FLUID MECHANISM
Filed June 19, 1946 3 Sheets-Sheet 2

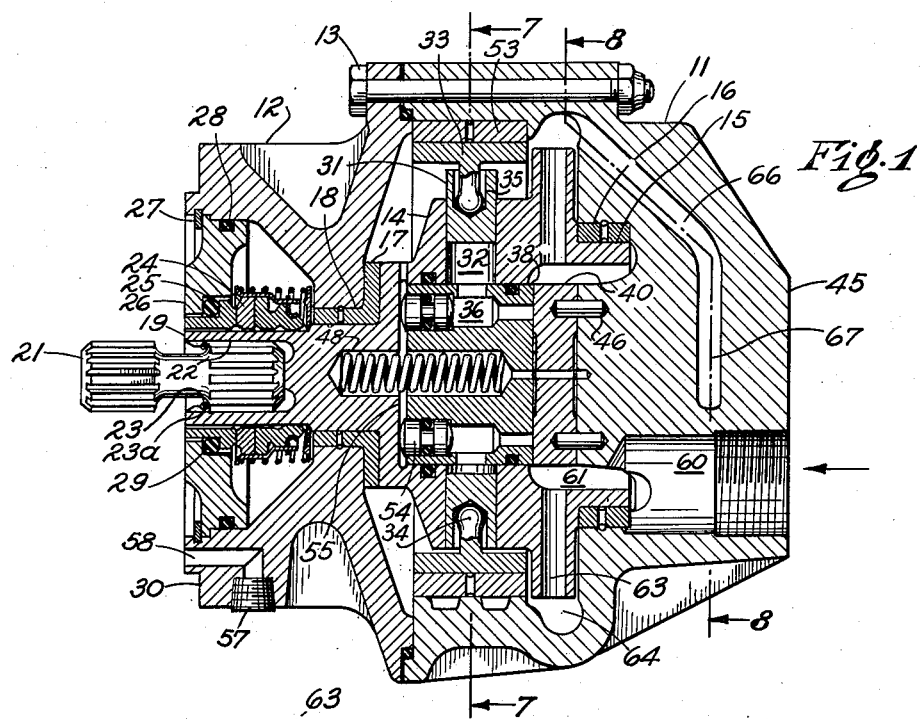

INVENTOR.
JOHN W. OVERBEKE
BY
Richey & Watts
ATTORNEYS

Dec. 9, 1952  J. W. OVERBEKE  2,620,733
HYDRAULIC FLUID MECHANISM
Filed June 19, 1946  3 Sheets-Sheet 3

INVENTOR.
JOHN W. OVERBEKE
BY
Richey & Watts
ATTORNEYS

Patented Dec. 9, 1952

2,620,733

UNITED STATES PATENT OFFICE 2,620,733

HYDRAULIC FLUID MECHANISM

John W. Overbeke, Cleveland, Ohio

Application June 19, 1946, Serial No. 677,714

21 Claims. (Cl. 103—5)

This invention relates to pumps of the positive displacement type, and is directed to the incorporation of a centrifugal supercharging pump therein.

The invention finds particular application to high-speed radial cylinder pumps of the type disclosed in my copending application, Serial No. 637,699, for Hydraulic Fluid Mechanism, filed December 28, 1945. In pumps of this type, as in other positive displacement pumps, unless the fluid entering the pump is under pressure, it may fail to fill the cylinders completely, and in some applications external booster pumps have been provided between a fluid reservoir and the positive displacement pump to overcome this difficulty.

In the pump according to the present invention, the rotating cylinder block incorporates a centrifugal impeller, the fluid traversing first the centrifugal portion of the pump, then the positive-displacement portion.

In addition, the centrifugal stage circulates the fluid throughout the pump in order to effect the lubrication thereof and dissipation of heat therefrom. The cooling function is particularly important when the positive-displacement stage is provided with means for arresting the fluid flow therethrough such, for example as that disclosed in my copending application, Serial No. 661,716, for Hydraulic Mechanism, filed April 12, 1946. In the structure embodying the present invention even though the discharge from the pump is interrupted, the centrifugal stage continues to lubricate and cool the mechanism.

It is an object of the invention to provide an improved pump having a centrifugal supercharging stage and a positive displacement stage.

Another object of the invention is to provide a pump in which a portion of the fluid discharged from the centrifugal stage is employed to lubricate the positive displacement stage.

Another object of the invention is to provide a pump in which fluid from the centrifugal stage may be circulated around the parts of the positive displacement stage for cooling purposes.

Another object of the invention is to provide a pump in which fluid under high pressure is utilized to lubricate bearings in the pump.

A further object of the invention is to provide a combined centrifugal and positive displacement pump having fluid passages which may readily be adapted to effect the operation of the pump in either direction of rotation.

Other objects and advantages more or less ancillary to the foregoing and the manner in which all the various objects are realized will appear in the following description which considered in connection with the accompanying drawings, sets forth the preferred embodiment of the invention.

Referring to the drawings:

Fig. 1 is a vertical section through the axis of the pump;

Fig. 2 is an elevation of the rotor, as viewed from the right in Fig. 1;

Fig. 3 is a side elevation of the valve block;

Fig. 4 is an end elevation of the valve block, as viewed from the left in Figs. 1 and 3;

Fig. 5 is a sectional view of a fragmentary portion of the pump, the section being taken on the plane indicated by the line 5—5 in Fig. 7;

Figure 6:
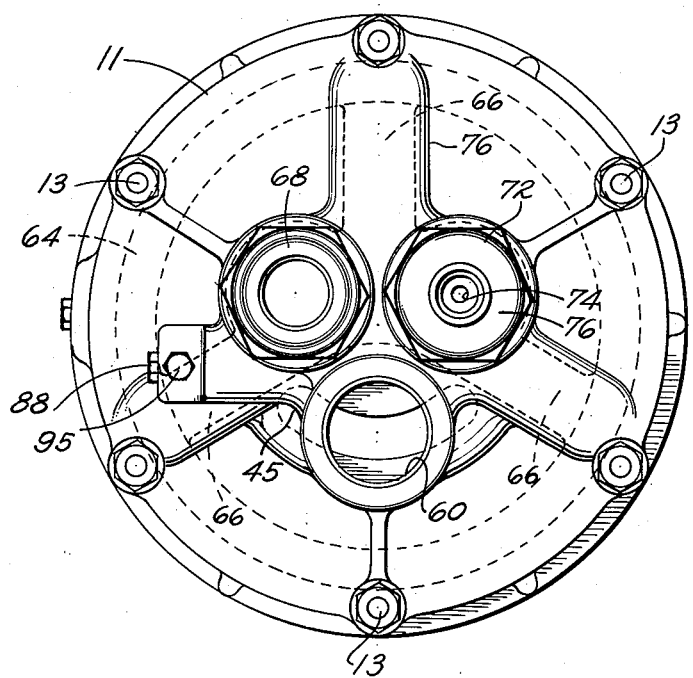
Fig. 6 is an elevational view of the pump.

The preferred embodiment of the pump embodies a casing 11 having a cover plate 12 secured thereon by bolts 13. A cylinder block 14 is mounted for rotation within the casing, upon a hub 15 within a bushing 16 in the end wall of the casing and upon a combined thrust and journal bearing 17, in a bore 18 in the cover plate 12. The cylinder block is formed with a trunnion or shaft 19 disposed in axial alignment with the hub 15 and mounted for rotation within the journal bearing 17. A coupling member 21, splined on both ends, is received in a broached socket 22 in the end of the shaft 19, and is retained therein by a snap ring 23 seated in a groove in the coupling member and engaged with a shoulder 23a in the socket 22.

In order to prevent leakage of the fluid about the shaft 19, the outer end of the cover plate 12 is provided with a sealing device which comprises, in brief, a collar 24 disposed in abutting engagement with a stationary sleeve 25 mounted in a plate 26, which is retained within the cover plate by a snap ring 27. A fluid sealing device, such as an O-ring seal 28, is interposed between the plate 26 and the cover plate, and a second O-ring 29 is mounted in the plate for engagement with the sleeve 25. The outer face of the cover plate 12 is preferably machined with a pilot bearing 30 to accommodate the alignment thereof with the prime mover with which it is associated.

Figure 7:
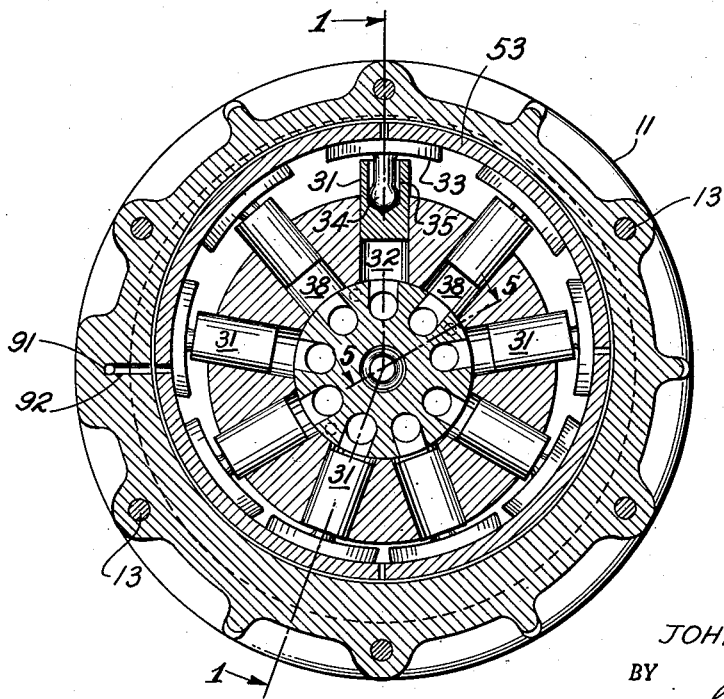
Fig. 7 is a vertical section taken on the plane indicated by the line 7—7 in Fig. 1.
Figure 8:
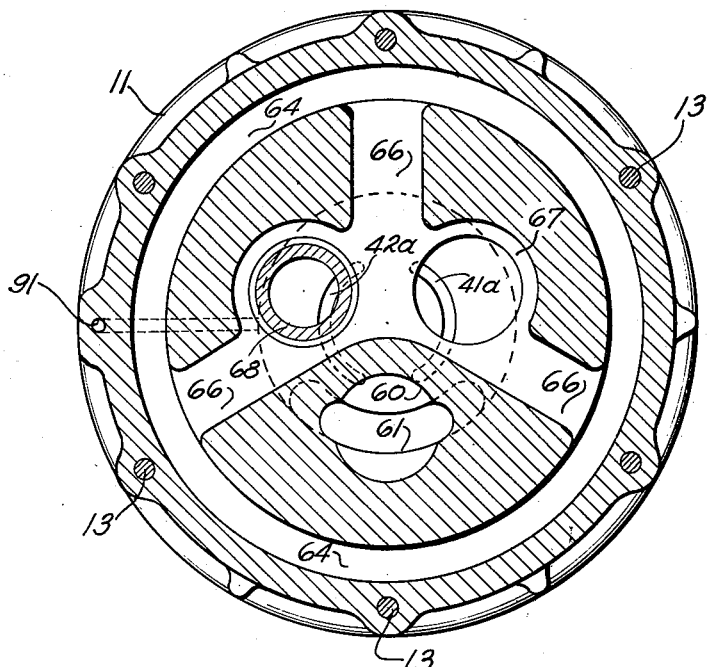
Fig. 8 is a cross section of the casing taken through the conduits interconnecting the two stages.
Figure 10:
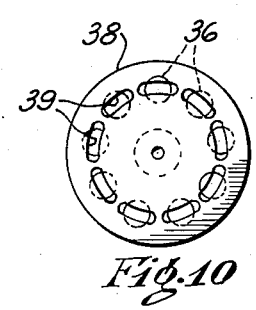
Fig. 10 is an end elevation of the valve block, as viewed from the right in Figs. 1 and 3.
Figure 11:
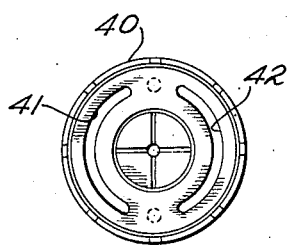
Fig. 11 is an elevation of the valve plate.

The pump structure proper comprises a plurality of pistons 31 mounted for reciprocation in radial cylinders 32 in the cylinder block 14 (Figs. 1 and 7). The movement of the pistons within the cylinders is effected through the engagement of shoes 33 with the inner surface of a track 53, which is mounted eccentrically relative to the axis of rotation of the cylinder block 14. The shoes 33 are formed with shanks terminating with spheroidal heads 34 which are received in sockets 35 in the outer ends of the pistons. The fluid flow to and from each cylinder is effected through an opening 36 (Figs. 1 and 3) in a cylindrical valve block 38 which is mounted in the center of the cylinder block 14 for rotation therewith. The openings 36 communicate with elongated ports 39 (Fig. 10) formed in the face of the valve block 38. The cooperating part of the valve mechanism comprises a valve plate 40 (Figs. 1, 9, and 11) provided with elongated arcuate openings 41 and 42 disposed in radial alignment with the ports 39. The openings 41 and 42 constitute continuations of passages 41a and 42a in the casing 11 which communicate respectively with the intake opening 43 of the positive displacement stage and the discharge opening 44 of the pump, both formed in a boss 45 of the casing 12. During the outward movement of each piston, the corresponding port 39 therefor will overlie the opening 41 in the valve plate 40, and during the discharge stroke of each piston, the complemental port 39 will communicate with the exhaust opening 42.

The valve plate 40 is restrained from rotation by dowel pins 46 (Fig. 1) inserted into the valve plate and into the casing 11. In order to maintain the valve block 38 in seated engagement with the valve plate 40, a compression spring 47 (Fig. 9) is mounted in a bore 48 in the cylinder block and an axially aligned opening 49 in the valve block. A fluid seal between the cylinder block and the valve block is effected through the provision of O-rings 50 and 51. As will be seen in Figs. 4 and 5, dowels 52 inserted in openings in the cylinder and valve blocks constrain the parts from rotation relative to each other.

As will be seen in Figs. 1, 3 and 4, floating pistons 54 mounted in bores communicating with the openings 36 in the valve block 38 provide, under the action of the confined fluid, a force against the surface 55 of the cylinder block 14 which maintains the valve block in intimate engagement with the valve plate 40. The channel 56 (Fig. 9) permits such fluid as may escape around the valve to be thrown outward centrifugally into the casing.

A drain plug 57 is provided in the bore 58 to facilitate the removal of excess lubricating oil issuing from the driving face of the prime mover, and to prevent intermixture of pump fluid and prime mover lubricant.

The structure so far described, relating to the radial cylinder portion of the pump, corresponds to similar disclosures in the above mentioned copending application.

In the present embodiment, fluid enters the pump through the intake passage 60 (Figs. 1 and 6) in the lower portion of the boss 45. The intake communicates with an annular passage 61 disposed between the valve plate 40 and the journal portion 15 of the cylinder block. The intermediate portion 62 of the block 14, which is of a greater diameter than the cylinder block portion proper, constitutes a centrifugal impeller, and is provided with a number of radial passages 63 through which the fluid is forced by centrifugal action from the passage 61 to an outer annular passage 64 formed in the casing 14 circumjacent the impeller.

The outlet from the passage 64 is constituted by three equi-spaced radial passages 66 cored in the end portion of the casing and converging to a central manifold 67 surrounding the inlet opening 43 and outlet opening 44 of the displacement stage of the pump. The outlet opening 44 is isolated from the manifold by a bushing 68 threaded into the opening 44 and extending therein beyond the manifold. O-rings 69 and 71, or other suitable sealing devices, disposed around the bushing on each side of the manifold, prevent leakage of fluid. The outer end of the opening 43 is closed by a threaded plug 72 sealed by O-rings 73, the inner end of the plug terminating adjacent the manifold 67. The cap of the plug 72 is provided with a constricted opening 74, in a boss 76 which is tapped for the reception of a pipe fitting and return line (not shown). A small amount of fluid at low pressure may be withdrawn through the opening 74, maintaining oil circulation to cool and lubricate the pump. Or, if desired, a plug may be screwed into the boss 76.

To adapt the pump for rotation in the reverse direction, it is necessary only to interchange the bushing 68 and the plug 72, making the passage 43 the pump outlet, and the passage 44 the inlet to the centrifugal stage.

Since the chamber in which the cylinder block 14 rotates is in communication around its periphery with the discharge passage 64 of the centrifugal stage, the discharge from the impeller will pass into the pump chamber providing further lubrication and cooling. The opening 74 is designed to afford the circulation of a sufficient volume of oil to prevent undue heating of the pump even though there is no discharge from the high-pressure outlet 44. Any excsess of oil in the casing will be expelled by the impeller when the fluid is permitted to flow through the outlet 44 to the discharge circuit of the pump.

The pump incorporates provisions for positive lubrication of the bearing surfaces from the high-pressure outlet of the machine. A horizontal oil passage 81 (Fig. 9) is drilled in the end of the casing 11, tangential to the lower surfaces of the passage 43 and 44 and intersects the passages 42 and 43 at 82 and 83, respectively. A circumferential groove 84 in the outer surface of the sleeve 68 and a radial hole 85 therethrough facilitate the flow of oil from the pump outlet into the passage 81. An O-ring 86 and the seal 69 prevent leakage between the sleeve and the casing. The sleeve 72 in the inlet to the positive-displacement stage is formed with a land between the O-rings 73 which blocks communication to the passage 81. When the pump is organized for rotation in the reverse direction, interchange of the bushings 68 and 72 will connect the opening 43 with the oil passage 81, and seal the opening 44 from passage 81.

Figure 9:
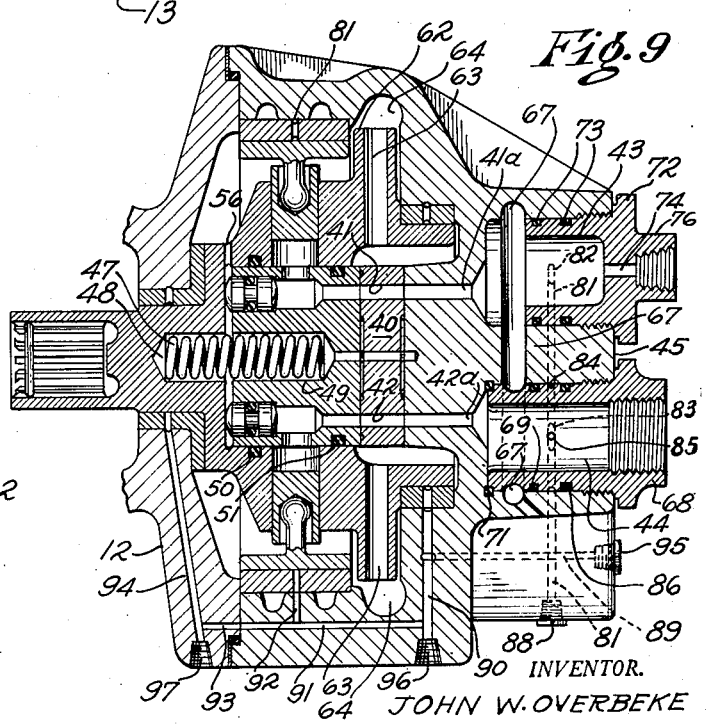
Fig. 9 is a horizontal section through the axis of the pump.

A plug 88 in a tapped boss closes the drill entry portion of the passage 81. A circulation of the lubricant is attained from the passage 81 through a series of intersection drilled passageways 89, 90, 91, and 92 in the casing 11, and passages 93 and 94 in the cover plate 12 (Fig. 9). The passageway 89 is closed at the exterior of the casing by a plug 95, and the passageway 90 and 94 by plugs threaded into tapped holes 96 and 97, respectively. Passageways 90, 92, and 94, respectively, deliver oil to circumferential grooves in the external surface of bushing 16, track 53, and bearing 17, while radial holes in these bearing elements facilitate lubrication of their inner surfaces. Thus these bearings are positively lubricated during the operation of the pump.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from he scope or spirit of the invention as herein claimed.

I claim:

1. In a pump comprising a positive displacement stage and a centrifugal supercharging stage, a casing common to both stages, a rotor comprising a cylinder block having radial cylinders and comprising an impeller, axially spaced from the cylinders, pistons in the cylinders, an annular piston guide mounted in the casing circumjacent the rotor, a discharge passage for fluid circumjacent the periphery of the impeller and having a diameter greater than that of the piston guide, and a conduit for conducting fluid from the passage to the cylinders.

2. In a pump comprising a positive displacement stage and a centrifugal supercharging stage, a casing common to both stages, a rotor comprising a cylinder block having radial cylinders and comprising an impeller, pistons in the cylinders, an annular piston guide mounted in the casing circumjacent the rotor, an annular recess in the casing axially spaced from the piston guide constituting a discharge passage for fluid circumjacent the periphery of the impeller, and a conduit for conducting fluid from the passage to the cylinders.

3. In a pump comprising a positive displacement stage and a centrifugal supercharging stage, a casing having a chamber common to both stages, a motor comprising a cylinder block in one end of the chamber having radial cylinders and comprising an impeller in the other end of the chamber, pistons in the cylinders, an annular piston guide eccentric to the rotor and mounted in the casing circumjacent the pistons, the chamber being annularly enlarged to form a discharge passage for fluid circumjacent the periphery of the impeller, and a conduit for conducting fluid from the passage to the cylinders, the discharge passage and the conduit providing the sole communication between the supercharging stage and the positive displacement stage.

4. In a pump comprising a positive displacement stage and a centrifugal supercharging stage, a casing common to both stages, a rotor comprising a cylinder block having radial cylinders and comprising an impeller, pistons in the cylinders, an annular piston guide eccentric to the rotor and mounted in the casing, a discharge passage for fluid circumjacent the periphery of the impeller and having a diameter greater than that of the piston guide, a conduit for conducting fluid from the passage, two ports communicating with the positive displacement stage, and means whereby the conduit may be isolated from either one of said ports.

5. In a pump comprising a positive displacement stage and a centrifugal supercharging stage, a casing common to both stages, a rotor comprising a cylinder block having radial cylinders and an impeller, pistons in the cylinders, an annular piston guide eccentric to the rotor and mounted in the casing, a discharge passage for fluid circumjacent the periphery of the impeller and having a diameter greater than that of the guide ring, a conduit in the casing for conducting fluid from the passage, two ports in the casing communicating with the positive displacement stage and opening exteriorly thereof, the ports being formed so as to communicate with the conduit, means for isolating either port from the conduit, and means for restricting the external opening of the other port.

6. In a pump comprising a positive displacement stage and a centrifugal supercharger, two conduits communicating with the positive displacement stage for intake and discharge of fluid, one of the conduits being the intake conduit when the pump is rotated in one direction and the other conduit being the intake conduit when the pump is rotated in the other direction, a manifold communicating with both conduits and with a discharge duct from the supercharger, and a sleeve adapted to be inserted in either conduit, the sleeve being adapted to seal the conduit from the manifold.

7. In a pump comprising a positive displacement stage and a centrifugal supercharger, a casing having two passages communicating with the positive displacement stage for intake and discharge of fluid, one of the passages being the intake passage when the pump is rotated in one direction and the other passage being the intake passage when the pump is rotated in the other direction, the casing being formed with a manifold communicating with both passages, a discharge conduit connecting the supercharger to the manifold, a sleeve adapted to be inserted in either passage, the sleeve being adapted to seal the passage from the manifold, and a plug adapted to be inserted in either passage to restrict the external opening thereof.

8. In a pump comprising a positive displacement stage and a centrifugal supercharger, a casing having two passages communicating with the positive displacement stage for intake and discharge of fluid, one of the passages being the intake passage when the pump is rotated in one direction and the other passage being the intake passage when the pump is rotated in the other direction, the casing being formed with a manifold communicating with both passages, a discharge conduit connecting the supercharger to the manifold, a sleeve adapted to be inserted in either passage, the sleeve being adapted to seal the passage from the manifold, and a plug adapted to be inserted in either passage to restrict the external opening thereof, the plug being provided with an external connection for a bleed line.

9. In a pump comprising a non-directional stage and a directional stage, two conduits communicating with the directional stage for intake and discharge of fluid, one of the conduits being the intake conduit when the pump is operated in one direction and the other conduit being the intake conduit when the pump is operated in the other direction, a manifold communicating with both conduits and with a discharge duct from the non-directional stage, and means for isolating either conduit from the manifold.

10. In a pump comprising a non-directional stage and a directional stage, two conduits communicating with the directional stage for intake and discharge of fluid, one of the conduits being the intake conduit when the pump is operated in one direction and the other conduit being the intake conduit when the pump is operated in the other direction, a manifold communicating with both conduits and with a discharge duct from the non-directional stage, means for isolating either conduit from the manifold and means for reducing the external opening of the other conduit.

11. In a pump comprising a non-directional stage and a directional stage, a casing having two passages communicating with the directional stage for intake and discharge of fluid, one of the passages being the intake passage when the pump is operated in one direction and the other passage being the intake passage when the pump is operated in the other direction, the casing being formed with a manifold communicating with both passages and with a discharge conduit from the non-directional stage, a sleeve adapted to be inserted in either passage, the sleeve being adapted to seal the passage from the manifold, and a plug adapted to be inserted in either passage to restrict the external opening thereof.

12. In a pump comprising a non-directional stage and a directional stage, a casing having two passages communicating with the directional stage for intake and discharge of fluid, one of the passages being the intake passage when the pump is operated in one direction and the other passage being the intake passage when the pump is operated in the other direction, the casing being formed with a manifold communicating with both passages and with a discharge conduit from the non-directional stage, a sleeve adapted to be inserted in either passage, the sleeve being adapted to seal the passage from the manifold, and a plug adapted to be inserted in either passage to restrict the external opening thereof, the casing being formed with a duct for lubricating fluid opening into both passages, the plug being formed so as to seal the passage from the duct, and the sleeve being formed so as to permit flow of fluid from the passage to the duct.

13. In a pump comprising a non-directional stage and a directional stage, a casing having two passages communicating with the directional stage for intake and discharge of fluid, one of the passages being the intake passage when the pump is operated in one direction and the other passage being the intake passage when the pump is operated in the other direction, the casing being formed with a manifold communicating with both passages and with a discharge conduit from the non-directional stage, a sleeve adapted to be inserted in either passage, the sleeve being adapted to seal the passage from the manifold, a plug adapted to be inserted in either passage to restrict the external opening thereof, and ducts for circulating the pumped fluid for lubrication, the ducts being adapted for connection with either passage, the sleeve being formed so as to permit fluid flow from the passage in which it is inserted to the ducts, and the plug being formed so as to seal the passage in which it is inserted from the ducts.

14. In a pump comprising a positive displacement stage and a centrifugal supercharging stage, a casing common to both stages, a rotor comprising a cylinder block having radial cylinders and comprising an impeller axially spaced from the cylinders, pistons in the cylinders, an annular piston guide circumjacent the rotor mounted in the casing, a discharge passage for fluid circumjacent the entire periphery of the impeller and having a diameter greater than that of the piston guide, and a conduit for conducting fluid from the passage to the cylinders.

15. In a pump comprising a positive displacement stage and a centrifugal supercharging stage, a casing common to both stages, a rotor comprising a cylinder block having radial cylinders and comprising an impeller, pistons in the cylinders, an annular piston guide circumjacent the rotor and mounted in the casing, an annular recess in the casing axially spaced from the piston guide constituting a discharge passage for fluid circumjacent the entire periphery of the impeller, and a conduit for conducting fluid from the passage to the cylinder.

16. In a pump comprising a positive displacement stage and a centrifugal supercharging stage, a casing having a chamber common to both stages, a rotor comprising a cylinder block in one end of the chamber having radial cylinders and comprising an impeller in the other end of the chamber, pistons in the cylinders, an annular piston guide eccentric to the rotor and mounted in the casing circumjacent the pistons, the chamber being annularly enlarged to form a discharge passage for fluid circumjacent the entire periphery of the impeller, and a conduit for conducting fluid from the passage to the cylinders.

17. In a pump comprising a positive displacement stage and a centrifugal supercharging stage, a casing common to both stages, a rotor comprising a cylinder block having radial cylinders and comprising an impeller axially spaced from the cylinders, pistons in the cylinders, an annular piston guide circumjacent the rotor mounted in the casing, a discharge passage for fluid circumjacent the periphery of the impeller and having a diameter greater than that of the piston guide, a conduit for conducting fluid from the passage to the cylinders, and a restricted orifice vent opening from the said conduit and providing a discharge therefrom so that fluid is circulated through the supercharging stage in excess of the requirements of the positive displacement stage.

18. In a pump comprising a positive displacement stage and a centrifugal supercharging stage, a casing common to both stages, a rotor comprising a cylinder block having radial cylinders and comprising an impeller, pistons in the cylinders, an annular piston guide circumjacent the rotor and mounted in the casing, an annular recess in the casing axially spaced from the piston guide constituting a discharge passage for fluid circumjacent the periphery of the impeller, a conduit for conducting fluid from the passage to the cylinder, and a restricted orifice vent opening from the said conduit and providing a discharge therefrom so that fluid is circulated through the supercharging stage in excess of the requirements of the positive displacement stage.

19. In a pump comprising a positive displacement stage and a centrifugal supercharging stage, a casing having a chamber common to both stages, a rotor comprising a cylinder block in one end of the chamber having radial cylinders and comprising an impeller in the other end of the chamber, pistons in the cylinders, an annular piston guide eccentric to the rotor and mounted in the casing circumjacent the pistons, the chamber being annularly enlarged to form a discharge passage for fluid circumjacent the periphery of the impeller, a conduit for conducting fluid from the passage to the cylinders, and a restricted orifice vent opening from the said conduit and providing a discharge therefrom so that fluid is circulated through the supercharging stage in excess of the requirements of the positive displacement stage.

20. In a pump, a casing, a positive displacement stage comprising a rotor having radial cylinders formed therein, pistons in the cylinders, means for reciprocating the pistons synchronously with the rotation of the rotor, inlet and outlet means for said positive displacement stage in said casing, valve means for said positive displacement stage comprising a valve block in the rotor rotatable therewith and engaging a stationary valve member along a plane normal to the axis of rotation, valve ports in said stationary member and said valve block serving to interconnect the inlet and outlet means with the cylinders of the rotor, means responsive to the fluid pressure in the ports in the valve block for maintaining the block in engagement with the stationary member, and a centrifugal supercharging stage comprising an impeller, output receiving means circumjacent the impeller comprising a recess in the casing, and a conduit connecting said output receiving means with the inlet means of the positive displacement stage.

21. In a pump, a casing, a positive displacement stage including a rotor comprising a block having radial cylinders; pistons in the cylinders, an annular guide circumjacent the rotor for reciprocating the pistons synchronously with rotation of the rotor, a valve member having a valve surface normal to the axis of rotation of the rotor and inlet and outlet ports therein, a valve block mounted in the rotor and rotatable therewith and having a face engaging the surface of said valve member, a reaction member for said valve block, means mounted in said valve block engaging said reaction member, and a centrifugal supercharging stage comprising an impeller mounted on said rotor, an annular recess in the casing spaced from said piston guide and circumjacent the impeller and a conduit connecting said recess with the inlet ports in said valve member whereby the fluid pressure from the supercharging stage maintains the valve block in engagement with the valve member over a wide range of operating conditions.

JOHN W. OVERBEKE.

REFERENCES CITED

The following references are of record in the file of this patent:

UNITED STATES PATENTS

| Number | Name | Date |
| --- | --- | --- |
| 2,007,197 | Hedblom | July 9, 1935 |
| 2,115,121 | Phillips | Apr. 26, 1938 |
| 2,130,299 | Ernst | Sept. 13, 1938 |
| 2,292,125 | Ifield | Aug. 4, 1942 |
| 2,293,693 | Wylie et al. | Aug. 18, 1942 |
| 2,385,990 | Huber | Oct. 2, 1945 |
| 2,392,543 | Mercier | Jan. 8, 1946 |
| 2,403,371 | Ifield et al. | July 2, 1946 |
| 2,407,013 | Ifield | Sept. 3, 1946 |